US011037059B2

United States Patent
Baker

(10) Patent No.: US 11,037,059 B2
(45) Date of Patent: Jun. 15, 2021

(54) SELF-SUPERVISED BACK PROPAGATION FOR DEEP LEARNING

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/619,904

(22) PCT Filed: Aug. 23, 2019

(86) PCT No.: PCT/US2019/047796
§ 371 (c)(1),
(2) Date: Dec. 5, 2019

(87) PCT Pub. No.: WO2020/046719
PCT Pub. Date: Mar. 5, 2020

(65) Prior Publication Data
US 2021/0004688 A1    Jan. 7, 2021

Related U.S. Application Data

(60) Provisional application No. 62/725,356, filed on Aug. 31, 2018.

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC ........ G06N 3/08; G06N 3/0454; G06N 20/20; G06N 3/084; G06N 3/02; G06Q 10/04
See application file for complete search history.

(56) References Cited

U.S. PATENT DOCUMENTS 6,876,989 B2   4/2005   Shi et al.
7,617,164 B2   11/2009  Burges et al.
(Continued)

FOREIGN PATENT DOCUMENTS

WO   WO 2018/175098 A1   9/2018
WO   WO 2018/194960 A1   10/2018
(Continued)

OTHER PUBLICATIONS

Serban et al., "A Hierarchical Latent Variable Encoder-Decoder Model for Generating Dialogues," 2017, Proceedings of the Thirty-First AAAI Conference on Artificial Intelligence, pp. 3295-3301 (Year: 2017).*

(Continued)

*Primary Examiner* — Miranda M Huang
*Assistant Examiner* — Catherine F Lee
(74) *Attorney, Agent, or Firm* — K&L Gates LLP

(57) ABSTRACT

A computer-implemented method for analyzing a first neural network via a second neural network according to a differentiable function. The method includes adding a derivative node to the first neural network that receives derivatives associated with a node of the first neural network. The derivative node is connected to the second neural network such that the second neural network can receive the derivatives from the derivative node. The method further includes feeding forward activations in the first neural network for a data item, back propagating a selected differentiable function, providing the derivatives from the derivative node to the second neural network as data, feeding forward the derivatives from the derivative node through the second neural network, and then back propagating a secondary objective through both neural networks. In various aspects, the learned parameters of one or both of the neural networks (Continued)

can be updated according to the back propagation calculations.

26 Claims, 4 Drawing Sheets

(56) References Cited

U.S. PATENT DOCUMENTS

| | | | |
|---|---|---|---|
| 2014/0279741 A1* | 9/2014 | Sow | G06N 20/20 |
| | | | 706/12 |
| 2016/0078339 A1* | 3/2016 | Li | G06N 7/005 |
| | | | 706/20 |
| 2016/0379115 A1 | 12/2016 | Burger et al. | |
| 2017/0132513 A1* | 5/2017 | Yu | G06N 3/08 |
| 2019/0095798 A1 | 3/2019 | Baker | |

FOREIGN PATENT DOCUMENTS

| WO | WO 2018/226492 A1 | 12/2018 |
|---|---|---|
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

International Search Report and Written Opinion of the International Searching Authority for International Application No. PCT/US2019/047796 dated Nov. 12, 2019.

* cited by examiner

SELF-SUPERVISED BACK PROPAGATION FOR DEEP LEARNING

PRIORITY

The present application is a national stage application under 35 U.S.C. § 371 of PCT application Serial No. PCT/US19/47796, filed Aug. 23, 2019, which claims priority to U.S. Provisional Patent Application Ser. No. 62/725,356, filed Aug. 31, 2018, both having the same title and inventor as indicated above, and both of which are incorporated herein by reference.

BACKGROUND

Machine learning has had significant success in recent years, especially deep learning using multi-layer neural networks. Deep neural networks are often trained by stochastic gradient descent in which partial derivatives of the loss function are computed by a process called back propagation. However, using the loss function requires knowing the correct answer. Although the correct answer is known for supervised training, it is not known for unsupervised training. Furthermore, derivatives computed by back propagation of the loss function for a known answer cannot be used for any computation that needs to be the same for operational data as for training data.

SUMMARY

Partial derivatives of a selected differentiable function of the output of a first machine learning system are computed by back propagation. The evaluation of the selected function for a data item does not require knowledge of the correct answer for the data item. The partial derivatives are used as data in a second machine learning system that can be trained for various objectives, including objectives for making internal information about the first machine learning system more easily interpretable by human users and easier to use by other machine learning systems. For example, the second machine learning system may provide information for (i) building ensembles, (ii) training another machine learning system as a learning coach, (iii) improving the robustness of the first machine learning system, (iv) computing a confidence score for a classification made by the first machine learning system, and many other applications. Preferably, both machine learning systems may be trained by stochastic gradient descent using partial derivatives that can be estimated by back propagation. For example, both machine systems may be feed-forward or recurrent neural networks.

FIGURES

Various aspects of the present invention are described herein by way of example in conjunction with the following figures.

DETAILED DESCRIPTION

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 1:
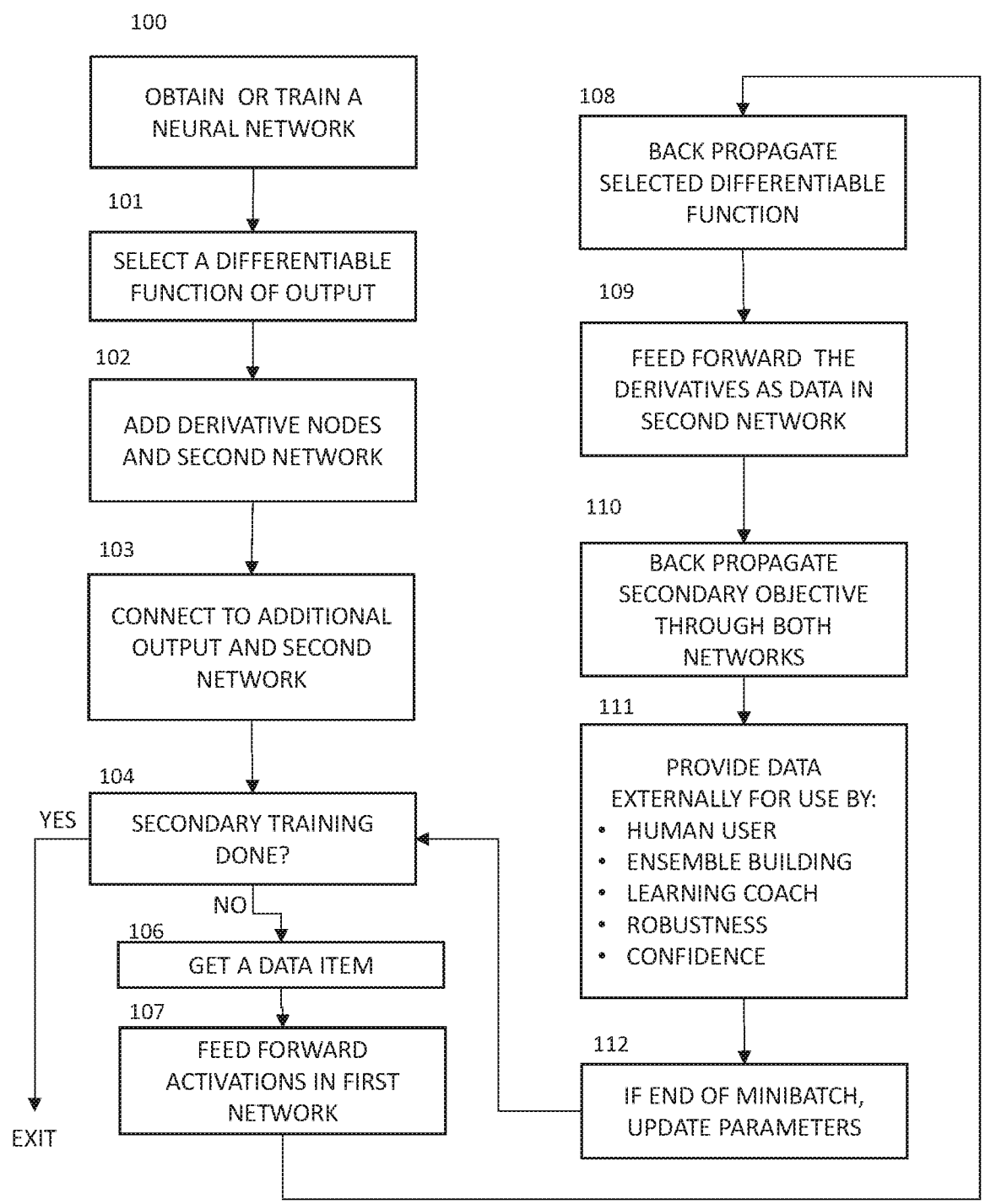
FIG. 1 is a flowchart of an illustrative aspect of the invention.
Figure 2:
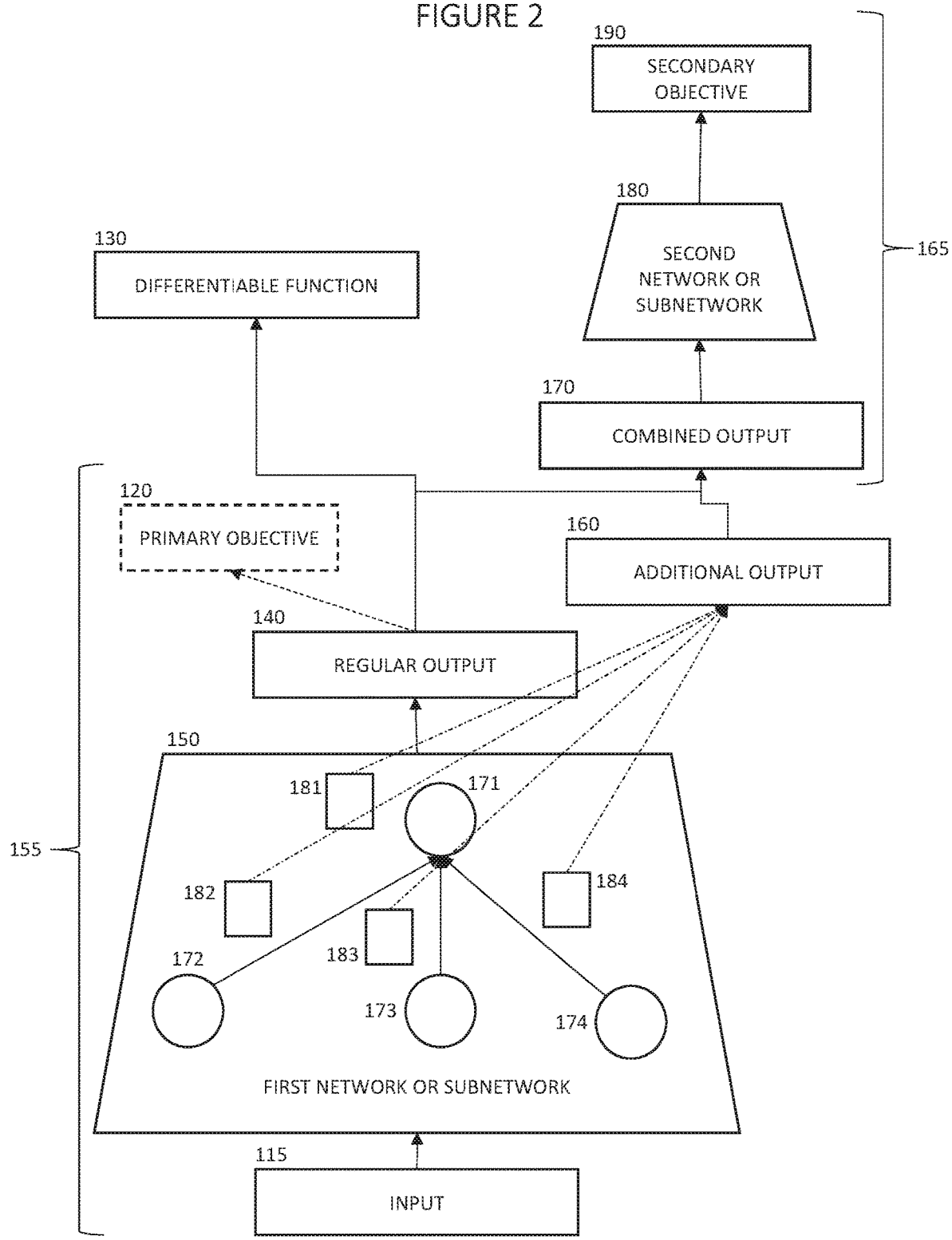
FIG. 2 is a block diagram of an illustrative aspect of the invention.
Figure 3:
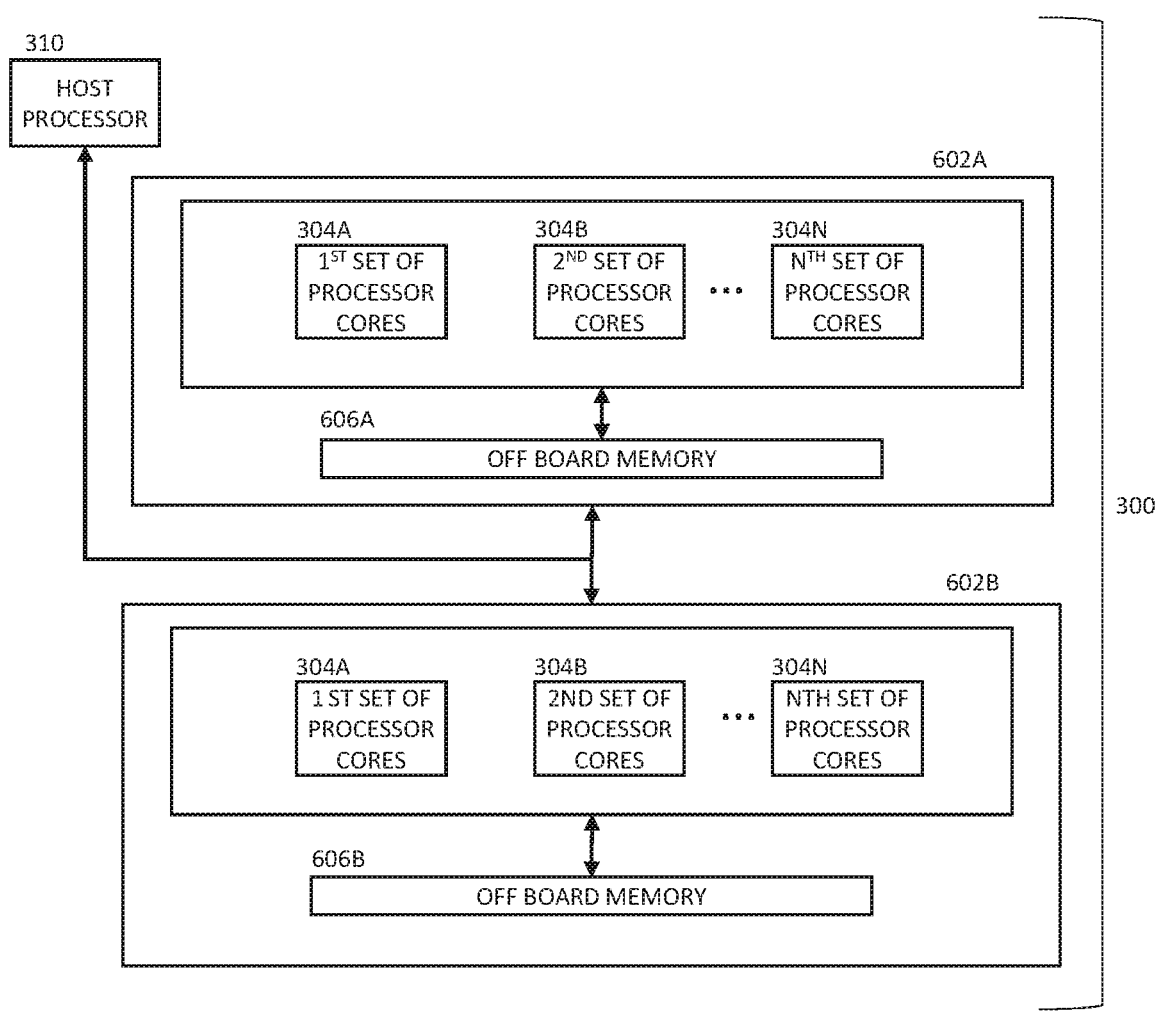
FIG. 3 is a diagram of a computer system that may be used to implement various aspects of the invention in various aspects.

FIG. 1 is a flowchart of a process in which a computer system, such as the computer system 300 illustrated in FIG. 3, uses self-supervised back propagation in situations in which labeled training data is not available, such as during operation or during unsupervised training. In the following description of FIG. 1, reference should also be made to FIG. 2, which is a block diagram of an illustrative aspect of the invention. The process illustrated in FIG. 1 can be embodied as computer executable instructions stored in a memory of a computer system 300 that, when executed by a processor (e.g., processor cores 304A-N), cause the computer system 300 to perform the enumerated steps.

Figure 4:
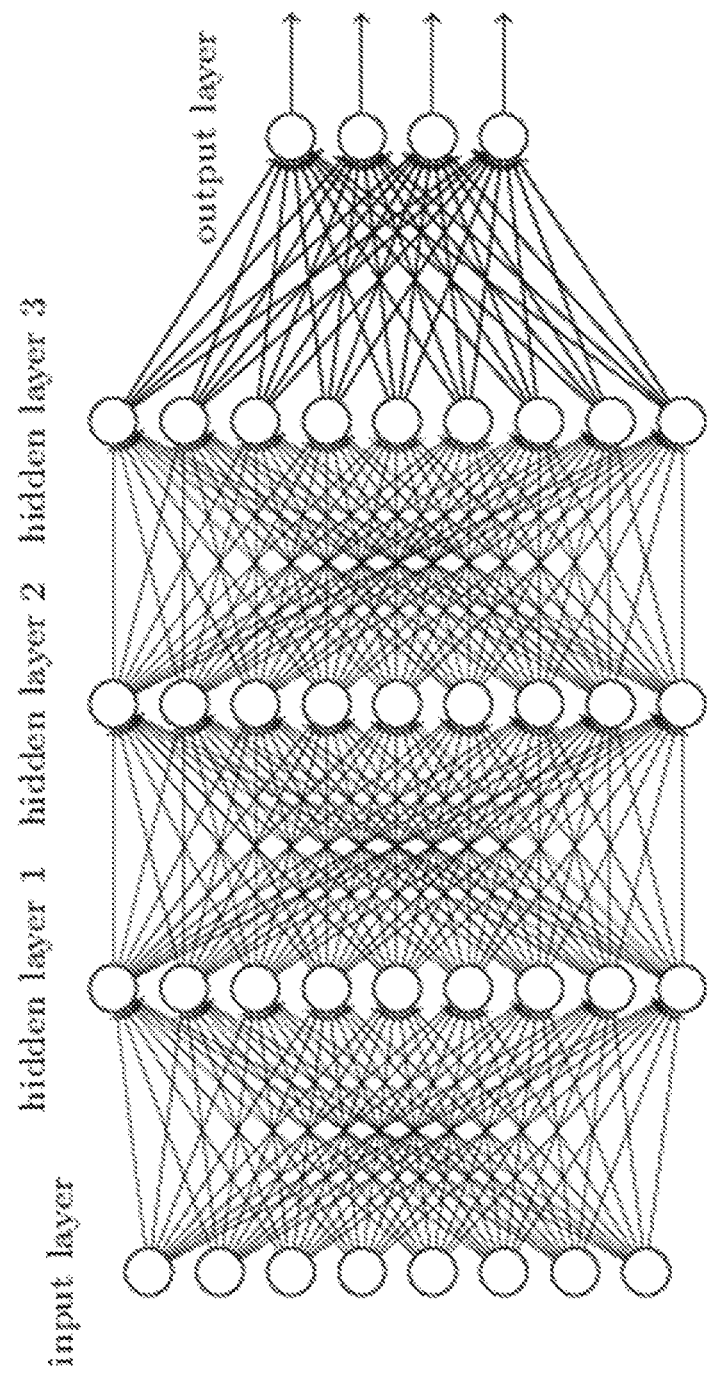
FIG. 4 is an illustration of a feed-forward neural network such as may be used in various aspects of various aspects of the invention.

At step 100, the computer system 300 obtains or trains a machine learning system. In one aspect, the obtained or trained machine learning system is a neural network, such as the example neural network shown in FIG. 4 or the neural network 150 shown in FIG. 2. A neural network comprises a set of nodes and directed arcs, typically arranged into layers. A feed-forward neural network comprises an input layer, an output layer, and zero or more inner layers, which are also called hidden layers. In a feed-forward layered neural network, each directed arc goes from a source node in a lower layer to destination node in a higher layer. Each arc is associated with a variable called the "weight" of the arc. Each node may be associated with a variable called the "bias" of the node. The arc weights and node biases are called "learned parameters." Training a neural network comprises estimating the values of the learned parameters to optimize a specified objective, such as the primary objective 120 in FIG. 2. In training a neural network on a classification task, the specified objective of the training, which may also be called a "loss function," is typically to minimize some measure of the difference between the activations of the nodes in the output layer of the neural network and the specified target values that indicate the correct classification for each item of training data. This measure of difference from a target is called the "loss function" or the "error cost function." FIG. 4 shows a feed-forward network with an input layer, an output layer, and three hidden layers.

Although the machine learning system 155 is shown and discussed as including a single neural network 150, in some aspects the machine learning system 155 may comprise an ensemble or other collection of a plurality of neural networks. In some aspects, an ensemble of neural networks may have been combined into a single network. In some aspects, a combined network may be converted back to an ensemble by separating the subnetworks corresponding to the ensemble members.

A feed-forward neural network can be trained by an iterative process called stochastic gradient descent. In stochastic gradient descent, the training data is organized into disjoint subsets called "minibatches." For each training data item in each minibatch, a feed-forward computation is done that computes the activation of each node in the network, proceeding forward through the network layer by layer. In supervised training, for each training data item the correct answer is known. The correct answer may be represented by a primary objective, such as the primary objective 120 in FIG. 2. Typically, the primary objective is in the form of a loss function that is a measure of the magnitude of the difference between the output 140 of the machine learning system and a specified answer. The output 140 and the specified correct answer may both be represented in the form of a vector of values. The primary objective 120 is shown in dashed lines in FIG. 2 because, in the illustrated aspect, the first neural network 150 is pre-trained or is trained in step 100 of FIG. 1. FIG. 2 shows the state of the system after the machine learning system 155 is connected to the second neural network 180, which generally corresponds to steps 102 and 103 in FIG. 1, and during training of the second neural network 180, which corresponds to steps 104-112 in FIG. 1. During the training of the second neural network 180, the use of the primary objective 120 is optional.

After the feed-forward computation of the node activations is performed, the computer system computes an estimate of the derivative of the loss function (i.e., the primary objective 120) with respect to each node activation and with respect to each learned parameter by applying the chain rule of calculus proceeding backwards through the network. This backwards computation is call "back propagation" and is well-known to those skilled in the art of training neural networks. The vector of estimated values of the partial derivatives of the loss function with respect to the learned parameters is called the gradient of the loss function.

The estimated partial derivatives are accumulated for all the training data items in a minibatch. The values of the learned parameters are then updated by making an incremental change in the direction of the negative of the gradient of the loss function. The iterative update process is completed for each minibatch in the training set and each complete pass through the training data is referred to as an "epoch" of the training process. The iterative stochastic gradient descent is repeated for multiple epochs until a stopping criterion is reached.

Iterative training based on stochastic gradient descent with minibatch updates and feed-forward node activation and back propagation of partial derivatives are all well-known to those skilled in the art of training neural networks.

An illustrative aspect of the machine learning system 155 (comprising input 115, a neural network 150, output 140, and objective 120) obtained or trained in step 100 is shown in FIG. 2. The circles within the neural network 150 represent regular nodes 171, 172, 173, 174. Although four nodes 171, 172, 173, 174 are shown, this is simply for illustrative purposes and the neural network 150 is not limited to any particular number or arrangement of nodes. These regular nodes 171, 172, 173, 174 participate in feed-forward activation and back propagation computations, as explained above. The rectangles in FIG. 2 represent special derivative nodes 181, 182, 183, 184 that will hold values of the derivatives of a function to be selected in step 101. These special derivative nodes 181, 182, 183, 184 are to be filled in by the computer system 300 (e.g., during step 108 of FIG. 1) with the values of derivatives that are computed during a back propagation computation, with the special derivative nodes 181, 182, 183, 184 given values similar to the way regular nodes 171, 172, 173, 174 are given values during feed-forward activation, except the values in these special derivative nodes 181, 182, 183, 184 are derivatives. These special derivative nodes 181, 182, 183, 184 may be connected to the additional output nodes to produce the output 160 either directly or by way of additional layers of derivative nodes with a second feed-forward computation (e.g., at step 109 of FIG. 1) starting with the special derivatives nodes 181, 182, 183, 184 whose values were computed by the computer system during a back propagation (step 108) through the first neural network 150. The computer system will do a second back propagation computation in step 110 of FIG. 1. Note that the differentiable function to be selected in step 101 does not depend on knowing the correct answer, so although the derivative values for the special derivative nodes 181, 182, 183, and 184 are computed by a back propagation computation, like the back propagation computation in supervised training, in general the derivative values computed for the special derivative nodes 181, 182, 183, 184 do not have the same values as the derivatives computed during supervised training.

In an illustrative aspect, at step 101, the computer system 300 selects a piecewise differentiable function of the output 140 of the machine learning system 155 obtained in step 100. The output 140 of the machine learning system 155 may be a scalar or a vector. If the machine learning system 155 is a classifier, the vector of the scores for the respective output categories may be taken as the output. The piecewise differentiable function to be selected by the computer system in step 101 is then a scalar-valued function of a vector.

The primary objective 120 can include a piecewise differentiable function of the output for each training data item. However, in supervised training, computing the primary objective 120 requires knowledge of the correct answer. In contrast to this, in step 101, the computer system 300 can select a piecewise differentiable function of the output that does not require knowledge of the correct answer. In one aspect, the process illustrated in steps 101 through 112 of FIG. 1 may be performed or executed during operation or during unsupervised training, when the correct answer is not known.

Various piecewise differentiable functions may be used in various aspects for various purposes, such as those discussed in association with step 108 and others. As an example, the value of the function may be the maximum score among the vector of output scores. As another example, the value of the function may be the difference between the maximum score and the second largest score. As a third example, the value of the function may be the cross-entropy between the vector of scores and a target vector that has value 1.0 for the category with the maximum score and 0 for all other categories. The computations of steps 101 through 112 may be done with any piecewise differentiable function.

In an illustrative aspect, at step 102, the computer system 300 adds additional nodes 181, 182, 183, 184 and corresponding output nodes to the first neural network 150. The additional output nodes generate the additional output 160.

Further, the computer system creates and initializes a second machine learning system 165 comprising an input 170, a neural network 180, and a secondary objective 190. The input 170 represents the concatenation of the regular output 140 from the regular output nodes of the first neural network 150 and the additional output 160 from the additional output nodes of the first neural network 150. The nodes in the block representing the input 170 are also the input nodes of the second neural network 180. As the second neural network 180 uses partial derivatives of the selected differentiable function, it can compute the same output for a data item whether or not a correct answer or target is known. Thus, the second neural network 180 can compute the same output in operation as on training data.

As mentioned before, in an illustrative aspect, the special derivative nodes 181, 182, 183, 184 contain values of partial derivatives of the function selected in step 101. These values are computed in step 108 of FIG. 1. In one aspect, one special derivative node can be assigned to or associated with each node in the first neural network 155. For example, in the aspect illustrated in FIG. 2, the first special derivative node 181 receives the partial derivation of the function selected in step 101 with respect to the output activation value of the first node 171. Correspondingly, the second, third, and fourth special derivative nodes 182, 183, 184 receive the partial derivatives of the function selected in step 101 with respect to the connection weights for the directed arcs from second, third, and fourth nodes 172, 173, 174, respectively, to node 171.

It should be noted that although the hidden layer(s) 150 is/are depicted as including four regular nodes 171, 172, 173, 174 and four corresponding special derivative nodes 181, 182, 183, 184, this is merely intended for illustrative purposes and there is no limit to the number of regular nodes 171, 172, 173, 174 and/or special derivative nodes 181, 182, 183, 184 that may be included in the hidden layer(s) of the first neural network 150.

In an illustrative aspect, at step 103, the computer system 300 creates connections between the special derivative nodes 181, 182, 183, and 184 and additional output nodes that produce or define the additional output 160. Each connection may be a direct connection through a directed arc or may be an indirect connection through a subnetwork of additional special derivative nodes. In various aspects, the subnetwork of connecting derivative nodes may compute more complex functions of the partial derivative as input to the second neural network, i.e., blocks 160 (the additional output from the special derivative nodes) and 170 (the combined or concatenated output from the regular nodes and the special derivative nodes). In one aspect, the special derivative nodes 181, 182, 183, 184 and any additional derivative nodes in the connecting subnetwork are not connected directly or indirectly to the regular output nodes of the neural network 150. In another aspect, a derivative node may be connected to a regular output node of the neural network 150. In such an aspect, the machine learning system 155 becomes a recurrent neural network. The recurrent neural network can be trained by being unrolled into a feed-forward network that models the recurrent neural network. Training a recurrent neural network by unrolling it to an approximating feed-forward network is well-known to those skilled in the art of training recurrent neural networks.

In an illustrative aspect, the second machine learning system 165 is trained by an iterative process of stochastic gradient descent based on minibatch updates. The loop of steps 106 through 111 represent the processing of one item of training data for the second neural network 180. The process depicted in FIG. 1 processes each training data item in a minibatch in the loop from step 104 to step 111, performs an update in step 112, and then proceeds to the next minibatch. When all the minibatches in the training data have been processed, that completes the process of one epoch. The iterative process of stochastic gradient descent continues for multiple epochs until a stopping criterion is met.

At step 104, the computer system 300 checks whether a stopping criterion has been satisfied, in which case the iterative training process is complete and exits. A stopping criterion can include, for example, (i) that the iterative training process has satisfied a convergence criterion, (ii) that a desired level of performance has been achieved, or (iii) that a specified number of epochs have been processed. If no stopping criterion has been satisfied, the process continues to step 106.

At step 106, the computer system 300 obtains or selects the next data item. The computations in steps 107 to 111 are all done using the data item obtained in step 106.

In an illustrative aspect, at step 107, the computer system 300 performs a feed-forward computation of the node activations in the first neural network 150.

At step 108, the computer system computes the partial derivatives of the differentiable function selected in step 101 (which is represented by block 130 of FIG. 2) with respect to the node activations, biases, arc weights, and/or other learned parameters for each node in the first neural network 150. Any subset of the nodes and learned parameters may be used, as specified by the system design and/or hyperparameters to trade off processing cost versus performance. These partial derivatives may be computed by back propagation based on the chain rule of calculus.

The differentiable function selected in step 101 is not used as an objective for stochastic gradient descent. Instead, the partial derivatives of the function selected in step 101 are used as data for the derivative nodes in higher layers of the first neural network 150 and as data for the second machine learning system 165.

In various illustrative aspects, at step 108, the computer system 300 provides these partial derivatives and functions computed from these derivatives in higher layers of the first neural network 150 to the additional output nodes generating the additional output 160 and thence to one or more external machine learning systems, such as the second neural network 180.

At step 109, the computer system 300 feeds forward the activation values and derivatives computed in steps 107 and 108 to the combined output 170 and then throughout the second network 180.

At step 110, the computer system 300 back propagates partial derivatives of the secondary objective 190. In some aspects, in addition to back propagating these partial derivatives through the first neural network 150, the partial derivatives are back propagated to block 170 then to blocks 140 and 160. Finally, the partial derivatives of the secondary objective 190 are back propagated backwards through the first neural network 150. The estimated partial derivatives may be accumulated for all the data items in a minibatch and then may be used to update the learned parameters in the second neural network 180 and, optionally, the learned parameters in the first neural network 150. If the learned parameters of the first neural network 150 are updated, optionally, the update may be determined by a weighted average of the estimated gradient of secondary objective 190 and the estimated gradient of primary objective 120. If the correct answer for primary objective 120 is not known for a data item, the learned parameters may be updated from the estimated gradient of secondary objective 190, without using primary objective 120.

In various aspects, the secondary objective 190 may be designed to provide information that is useful for various tasks, such as the examples given in step 111.

In various aspects, once the second neural network 180 has been at least partially trained, at step 111, the computer system 300 may use the data about the activation values and derivatives of the first neural network 150 as computed in steps 107 and 108 and the information derived from that data by the second neural network 180 for one or more of various tasks.

For example, information about the values of partial derivatives as well as the activations of the first neural network 150 may help a human user understand and interpret the second neural network 150, the progress and behavior of its training process, and its reaction to a particular data item. This information may be supplemented and made easier to interpret by the second neural network 180. For example, the secondary objective 190 may be designed to help the second neural network 180 to learn information that a human user may want for making decisions about the use of the output of the first neural network 150 or to control the development and training process.

As another example, the derivatives computed in step 108 may be used for creating a new ensemble member by selecting data for new ensemble members based on derivatives computed for an existing ensemble member, as described in PCT Application No. PCT/US2019/040333, filed Jul. 2, 2019, entitled BUILDING ENSEMBLES FOR DEEP LEARNING BY PARALLEL DATA SPLITTING, which is incorporated herein by reference in its entirety.

As yet another example, information similar to the information used by a human user may be used by a learning coach. A learning coach is a separate machine learning system that is trained to help manage the learning process of a first machine learning system, such as the first neural network 150 in FIG. 2. A learning coach may change hyperparameters that affect the learning of the first machine learning system in order to, for example, accelerate the convergence of the first machine learning system. A learning coach may control the selection of training data, such as causing the first machine learning system to specialize on certain data when the first machine learning system is a member of an ensemble or another collection of multiple machine learning systems. A machine learning system may also make changes in the architecture of the first machine learning system by, for example, adding or deleting arcs and nodes, merging two or more networks into a single network, or adding a member to an ensemble.

Learning coaches are described in more detail in the following applications, which are incorporated herein by reference in their entirety: PCT Application No. PCT/US2017/052037, filed Sep. 18, 2017, entitled LEARNING COACH FOR MACHINE LEARNING SYSTEM, published as WO2018/063840; and PCT Application No. PCT/US2018/020887, filed Mar. 5, 2018, entitled LEARNING COACH FOR MACHINE LEARNING SYSTEM, published as WO2018/175098.

As another example, modifications may be made to the architecture of the network 150 by a learning coach, for example, by adding one or more nodes, as described in PCT Application No. PCT/US2018/035275, filed May 31, 2018, entitled ASYNCHRONOUS AGENTS WITH LEARNING COACHES AND STRUCTURALLY MODIFYING DEEP NEURAL NETWORKS WITHOUT PERFORMANCE DEGRADATION, published as WO2018/226492; and PCT Application No. PCT/US2019/015389, filed Jan. 28, 2019, entitled SELF ORGANIZING PARTIALLY ORDERED NETWORKS, published as WO2019/152308, which are both incorporated herein by reference in their entirety. One of the techniques used in PCT Application No. PCT/US2019/015389 is to estimate the value of adding a directed arc connecting a first specified node to a second specified node by computing the correlation of the activation of the first specified node with a partial derivative associated with the second specified node.

As yet another example, information about the derivatives computed step 108 may be used to analyze and correct the vulnerability of network 150 to random or deliberate adversarial disturbances, as described in PCT Application No. PCT/US2019/039383, filed Jun. 27, 2019, entitled ANALYZING AND CORRECTING VULNERABILITIES IN NEURAL NETWORKS, which is incorporated herein by reference in its entirety. The vulnerability of a network to changes in the input may be estimated by partial derivatives with respect to the input values. In some aspects, the partial derivatives are computed using modified activation functions that make the vulnerability more prominent.

More generally, techniques that normally require knowledge of the correct answer in the above referenced applications may be generalized to apply to unsupervised learning or adaptive learning during operation in various aspect of the invention disclosed herein, using back propagation of a function selected in step 101 in place of back propagation of a loss function that requires knowledge of the correct answer.

In another illustrative aspect, a differentiable function that does not depend on knowledge of the correct answer is selected in step 101 even for training data for which the correct answer is known. For example, to compute a confidence estimate of the reliability of a classification done during operation, it is preferable to use the same process that will be used during operation during training of a machine learning system that computes a confidence score. That means that even during training the confidence computation should not use knowledge of the correct answer even though that knowledge is available. In one aspect, the best scoring and second best scoring output categories are identified in step 101 and the difference between their scores is used as the differentiable function selected in step 101. From the value of this difference and its partial derivatives at potentially vulnerable nodes, the second neural network 180 may be trained to compute an estimate of its confidence in the reliability of the category with the maximum score.

In some aspects, the second neural network 180 may itself be a learning coach. In such an aspect, the outputs of the second neural network 180 may trigger decisions and actions affecting the training of the first neural network 150.

In an illustrative aspect, at step 112, the computer system 300 checks whether the loop from step 104 to step 112 has finished the processing of a minibatch. If so, the computer system 300 updates the learned parameters, such as the weights associated with the directed arcs and the biases associated with the nodes of network, based on the estimates of the partial derivatives of the secondary objective 190. In some aspects, the back propagation of partial derivatives of the secondary objective 190 proceeds backwards through second neural network 180 to its input (i.e., the combined output 170), the regular output 140, the additional output 160, and then backwards into the first neural network 150 to compute estimated partial derivatives of secondary objective 190 with respect to the learned parameters of the first neural network 150 as well as of the second neural network 180. In these aspects, updates to the learned parameters in the first neural network 150 may be based on a weighted sum of the partial derivatives of the secondary objective 190 and the primary objective 120, each weighted by its respective learning rate. After step 112, the computer system 300 can continue to step 104 to check for a stopping criterion and then either exit the illustrated process or continue with the next minibatch or the next epoch.

FIG. 3 is a diagram of a computer system 300 that could be used to implement the aspects described above, such as the process described in FIG. 1. The illustrated computer system 300 comprises multiple processor units 602A-B that each comprises, in the illustrated aspect, multiple (N) sets of processor cores 304A-N. Each processor unit 602A-B may comprise on-board memory (ROM or RAM) (not shown) and off-board memory 306A. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various aspects, the different processor cores 304 may train and/or implement different networks or subnetworks or components. For example, in one aspect, the cores of the first processor unit 602A may implement the first machine learning system 155 and the second processor unit 602B may implement the second machine learning system 165. As another example, another multiple processor unit may implement an external machine learning system that receives the output of the second neural network 180 as input. Further, different sets of cores in the first and/or second processor units 602A, 602B may be responsible for different subnetworks in the machine learning systems 155, 165 or different ensemble members where the machine learning systems 155, 165 comprise an ensemble. One or more host processors 310 may coordinate and control the processor units 602A-B.

The process depicted in FIG. 1 can be embodied as a set of instructions stored within a memory (e.g., an integral memory of the processing units 602A, 602B or an off board memory 306A couple to the processing units 602A, 602B or other processing units) coupled to one or more processors (e.g., at least one of the sets of processor cores 304A-N of the processing units 602A, 602B or another processor(s) communicatively coupled to the processing units 3 602A, 602B), such that, when executed by the one or more processors, the instructions cause the processors to perform the aforementioned process by, for example, controlling the machine learning systems 202, 206 stored in the processing units 602A, 602B.

In other aspects, the system 300 could be implemented with one processor unit 302. In aspects where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "computing," "calculating," "determining," "training," "back propagating," "feeding forward," "adding," or the like, refer to the action and processes of a computer system (e.g., the computer system 300 of FIG. 3), or similar electronic computing device, that manipulates and transforms data represented as physical (electronic) quantities within the computer system's registers and memories into other data similarly represented as physical quantities within the computer system memories or registers or other such information storage, transmission, or display devices.

FIG. 4 is a drawing of an example of a feed-forward neural network. In this discussion, a neural network comprises a network of nodes organized into layers, a layer of input nodes, zero or more inner layers of nodes, and a layer of output nodes. There is an input node associated with each input variable and an output node associated with each output variable. An inner layer may also be called a hidden layer. A given node in the output layer or in an inner layer is connected to one or more nodes in lower layers by means of a directed arc from the node in the lower layer to the given higher layer node. A directed arc may be associated with a trainable parameter, called its weight, which represents the strength of the connection from the lower node to the given higher node. A trainable parameter is also called a "learned" parameter. Each node is also associated with an additional learned parameter called its "bias." In some aspects, there are additional elements not illustrated in FIG. 4. Other parameters that control the learning process are called "hyperparameters." The neural network illustrated in FIG. 4 has an input layer, an output layer, and three hidden layers.

Based on the above description, it is clear that aspects of the present invention can be used to improve many different types of machine learning systems, particularly neural networks. For example, aspects of the present invention can improve recommender systems, speech recognition systems, and classification systems, including image and diagnostic classification systems, to name but a few examples.

Various aspects of the subject matter described herein are set out in the following aspects, implementations, and/or examples, which can be interchangeably combined together in various combinations:

In one general aspect, a computer-implemented method for analyzing a first neural network via a second neural network according to a differentiable function, the second neural network comprising an objective function, the method comprising: adding, by a computer system, a derivative node to the first neural network; iteratively for n=1 to N data items in a data set, where N>2: computing, by the computer system, first feed-forward activation values in the first neural network for an nth data item; computing, by the computer system, derivatives of the differentiable function with respect to one or more learned parameters of each node of the first neural network; wherein the derivative node receives the derivative of the differentiable function with respect to the one or more learned parameters computed for a node of the first neural network; wherein the derivative node is connected to the second neural network such that the second neural network can receive the derivative as input; computing, by the computer system, second feed-forward activation values in the second neural network for the derivative of the differentiable function provided to the second neural network from the derivative node; and computing, by the computer system, derivatives of the objective function with respect to each of the one or more learned parameters of each node in both the first neural network and the second neural network; and after an Nth iteration, updating, by the computer system, the one or more learned parameters of the first neural network and/or the second neural network according a gradient of the objective function; wherein the gradient of the objective function is defined by the derivatives of the objective function for the N iterations.

In one aspect, the first neural network has been trained according to a primary objective function; and the differentiable function differs from the primary objective function.

In one aspect, the differentiable function determines a maximum score from a vector of scores output by the first neural network.

In one aspect, the differentiable function determines a difference between a maximum score and a second largest score from a vector of scores output by the first neural network.

In one aspect, the method further comprises: determining, by the computer system, which of the nodes of the first neural network are potentially vulnerable nodes according to the derivatives of the differentiable function with respect to the one or more learned parameters of each node of the first neural network; and computing, by the computer system, a confidence score, via the second neural network, according to the difference and the derivatives of the differentiable function for the potentially vulnerable nodes.

In one aspect, the differentiable function determines a cross-entropy between a vector of scores output by the first neural network and a target vector.

In one aspect, the differentiable function is not dependent upon a correct answer for the nth data item.

In one aspect, the method further comprises: providing, by the computer system, a learning coach with at least one of: the second feed-forward activation values in the second neural network for the derivative of the differentiable function; or the derivatives of the objective function with respect to the one or more learned parameters of each node in both the first neural network and the second neural network.

In one aspect, the method further comprises: changing, by the computer system, a hyperparameter of the first neural network via the learning coach; wherein the hyperparameter controls a learning rate of the first neural network.

In one aspect, the method further comprises: generating, by the computer system, a new machine learning system; selecting, by the computer system, a subset of the data set according to the derivatives of the differentiable function with respect to the one or more learned parameters of each node of the first neural network; and training, by the computer system, the new machine learning system on the subset of the data set.

In one aspect, the first neural network and the new machine learning system define an ensemble.

In one aspect, the first neural network comprises a primary objective; the objective comprises a secondary objective; and updating the one or more learned parameters the first neural network and/or the second neural network comprises: updating, by the computer system, the one or more learned parameters of the first neural network according to a weighted sum of the derivatives of the primary objective and the secondary objective.

In one aspect, the weighted sum is calculated according to a controllable learning rate for each of the primary objective and the secondary objective.

In another general aspect, a computer system comprises a processor and a memory coupled to the processor, the memory storing a first neural network, a second neural network, and instructions that, when executed by the processor, cause the computer system to perform the method(s) enumerated above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

What is claimed is:

1. A computer-implemented method for analyzing a first neural network via a second neural network according to a piecewise differentiable function, wherein the first neural network comprises a first network objective function and a plurality of primary nodes and the second neural network comprises a plurality of primary nodes, and the second network comprises a second network objective function, the method comprising:

training, by a computer system, the first neural network according to the first network objective function, wherein training the first neural network comprises computing, by the computer system, an estimate of a derivative of the first network objective function with respect to an activation value for each primary node of the first neural network;

after training the first neural network:

adding, by the computer system, a derivative node to the first neural network, wherein the derivative node is for storing derivative values of the piecewise differentiable function, and such that training of the first neural network does not involve estimating the derivative of the first network objective function with respect to activation values of the derivative node;

iteratively for n=1 to N data items in a data set, where N>2:

computing, by the computer system, first feed-forward activation values for the plurality of primary nodes in the first neural network for an nth data item;

computing, by the computer system, the derivative values of the piecewise differentiable function with respect to one or more learned parameters of each primary node of the first neural network;

wherein the derivative node receives and stores a first derivative value of the piecewise differentiable function with respect to at least one learned parameter computed for a first primary node of the first neural network, wherein the first primary node is one of the plurality of primary nodes of the first neural network;

wherein the derivative node is connected to the second neural network such that the second neural network receives the first derivative value as input;

computing, by the computer system, second feed-forward activation values in the second neural network for the first derivative value of the piecewise differentiable function provided to the second neural network from the derivative node; and computing, by the computer system, derivatives of the second network objective function with respect to each of the one or more learned parameters of each primary node in both the first neural network and the second neural network; and after an Nth iteration, updating, by the computer system, the one or more learned parameters of at least one of the first neural network or the second neural network according to a gradient of the second network objective function;

wherein the gradient of the second network objective function is defined by the derivatives of the second network objective function for the N iterations.

2. The computer-implemented method of claim 1, wherein:

the piecewise differentiable function differs from the first network objective function.

3. The computer-implemented method of claim 1, wherein the piecewise differentiable function determines a maximum score from a vector of scores output by the first neural network.

4. The computer-implemented method of claim 1, wherein the piecewise differentiable function determines a difference between a maximum score and a second largest score from a vector of scores output by the first neural network.

5. The computer-implemented method of claim 4, further comprising:

determining, by the computer system, which of the primary nodes of the first neural network are potentially vulnerable primary nodes according to the derivatives of the piecewise differentiable function with respect to the one or more learned parameters of each primary node of the first neural network; and computing, by the computer system, a confidence score, via the second neural network, according to the difference and the derivative values of the piecewise differentiable function for the potentially vulnerable primary nodes.

6. The computer-implemented method of claim 1, wherein the piecewise differentiable function determines a cross-entropy between a vector of scores output by the first neural network and a target vector.

7. The computer-implemented method of claim 1, wherein the piecewise differentiable function is not dependent upon a correct answer for the nth data item.

8. The computer-implemented method of claim 1, further comprising:

providing, by the computer system, a learning coach with at least one of:

the second feed-forward activation values in the second neural network for the derivative values of the piecewise differentiable function; or the derivatives of the second network objective function with respect to the one or more learned parameters of each primary node in both the first neural network and the second neural network.

9. The computer-implemented method of claim 8, further comprising:

changing, by the computer system, a hyperparameter of the first neural network via the learning coach;

wherein the hyperparameter controls a learning rate of the first neural network.

10. The computer-implemented method of claim 1, further comprising:

generating, by the computer system, a new machine learning system;

selecting, by the computer system, a subset of the data set according to the derivative values of the piecewise differentiable function with respect to the one or more learned parameters of each primary node of the first neural network; and training, by the computer system, the new machine learning system on the subset of the data set.

11. The computer-implemented method of claim 10, wherein the first neural network and the new machine learning system define an ensemble.

12. The computer-implemented method of claim 1, wherein:

updating the one or more learned parameters of the at least one of the first neural network or or the second neural network comprises:

updating, by the computer system, the one or more learned parameters of the first neural network according to a weighted sum of the derivatives of the first network objective function and the second network objective function.

13. The computer-implemented method of claim 12, wherein the weighted sum is calculated according to a controllable learning rate for each of the first network objective function and the second network secondary objective function.

14. A computer system for analyzing a first neural network via a second neural network according to a piecewise differentiable function, wherein the first neural network comprises a first network objective function and a plurality of primary nodes and the second neural network comprises a plurality of primary nodes, and the second network comprises a second network objective function, the computer system comprising:

a processor; and a memory coupled to the processor, the memory storing:

the first neural network;

the second neural network; and instructions that, when executed by the processor, cause the computer system to:

train the first neural network according to the first network objective function, by computing an estimate of a derivative of the first network objective function with respect to an activation value for each primary node of the first neural network;

after training the first neural network:

add a derivative node to the first neural network, wherein the derivative node is for storing derivative values of the piecewise differentiable function, and such that training of the first neural network does not involve estimating the derivative of the first network objective function with respect to activation values of the derivative node;

iteratively for n=1 to N data items in a data set, where N>2:

compute first feed-forward activation values for the plurality of primary nodes in the first neural network for an nth data item;

compute derivative values of the piecewise differentiable function with respect to one or more learned parameters of each primary node of the first neural network;

wherein the derivative node receives and stores a first derivative value of the piecewise differentiable function with respect to at least one learned parameter computed for a first primary node of the first neural network, wherein the first primary node is one of the plurality of primary nodes of the first neural network;

wherein the derivative node is connected to the second neural network such that the second neural network receives the first derivative value as input;

compute second feed-forward activation values in the second neural network for the first derivative value of the piecewise differentiable function provided to the second neural network from the derivative node; and compute derivatives of the second network objective function with respect to each of the one or more learned parameters of each primary node in both the first neural network and the second neural network; and after an Nth iteration, update the one or more learned parameters of at least one of the first neural network or the second neural network according to a gradient of the second network objective function;

wherein the gradient of the objective function is defined by the derivatives of the objective function for the N iterations.

15. The computer system of claim 14, wherein:

the piecewise differentiable function differs from the first network objective function.

16. The computer system of claim 14, wherein the piecewise differentiable function determines a maximum score from a vector of scores output by the first neural network.

17. The computer system of claim 14, wherein the piecewise differentiable function determines a difference between a maximum score and a second largest score from a vector of scores output by the first neural network.

18. The computer system of claim 17, wherein the instructions further cause the computer system to:

determine which of the primary nodes of the first neural network are potentially vulnerable primary nodes according to the derivative values of the piecewise differentiable function with respect to the one or more learned parameters of each primary node of the first neural network; and compute a confidence score, via the second neural network, according to the difference and the derivative values of the piecewise differentiable function for the potentially vulnerable nodes.

19. The computer system of claim 14, wherein the piecewise differentiable function determines a cross-entropy between a vector of scores output by the first neural network and a target vector.

20. The computer system of claim 14, wherein the piecewise differentiable function is not dependent upon a correct answer for the nth data item.

21. The computer system of claim 14, wherein the instructions further cause the computer system to:

provide a learning coach with at least one of:

the second feed-forward activation values in the second neural network for the derivative values of the piecewise differentiable function; or the derivatives of the second network objective function with respect to the one or more learned parameters of each primary node in both the first neural network and the second neural network.

22. The computer system of claim 21, wherein the instructions further cause the computer system to:

change a hyperparameter of the first neural network via the learning coach;

wherein the hyperparameter controls a learning rate of the first neural network.

23. The computer system of claim 14, wherein the instructions further cause the computer system to:

generate a new machine learning system;

select a subset of the data set according to the derivative values of the piecewise differentiable function with respect to the one or more learned parameters of each primary node of the first neural network; and train the new machine learning system on the subset of the data set.

24. The computer system of claim 23, wherein the first neural network and the new machine learning system define an ensemble.

25. The computer system of claim 14, wherein:

the instructions cause the computer system to update the one or more learned parameters of the at least one of the first neural network or the second neural network by causing the computer system to:

update the one or more learned parameters of the first neural network according to a weighted sum of the derivatives of the first network objective function and the second network objective function.

26. The computer system of claim 25, wherein the weighted sum is calculated according to a controllable learning rate for each of the first network objective function and the second network objective function.

* * * * *